United States Patent [19]

Perucca et al.

[11] 4,059,736
[45] Nov. 22, 1977

[54] DUAL TESTING SYSTEM FOR SUPERVISING DUPLICATED TELECOMMUNICATION EQUIPMENT

[75] Inventors: Giovanni Perucca; Flavio Melindo, both of Turin; Girolamo De Vincentiis, San Mauro Torinese, all of Italy

[73] Assignee: CSELT - Centro Studi e Laboratori Telecomunicazioni S.p.A., Turin, Italy

[21] Appl. No.: 697,234

[22] Filed: June 17, 1976

[30] Foreign Application Priority Data

June 17, 1975 Italy .................... 68551/75

[51] Int. Cl.$^2$ ............................................. H04M 3/22
[52] U.S. Cl. ............................ 179/175.2 R; 364/200
[58] Field of Search .................. 179/175.2 R, 175.2 C; 445/1; 364/200

[56] References Cited

U.S. PATENT DOCUMENTS

| | | | |
|---|---|---|---|
| 3,865,999 | 2/1975 | Spitaels ......................... | 179/175.2 R |
| 3,898,386 | 8/1975 | Gaon .............................. | 179/175.2 R |
| 3,908,099 | 9/1975 | Borbas et al. ................. | 179/175.2 R |

*Primary Examiner*—Douglas W. Olms
*Attorney, Agent, or Firm*—Karl F. Ross

[57] ABSTRACT

Two processors UP1 and UP2, designed to test the operation of a pair of switching networks IN1 and IN2 in a telecommunication system through respective sets of peripheral interface units P11 etc. and P21 etc., are interconnected for parallel operation and are each linked with both sets of peripheral units via branched output and input multiples carrying outgoing and incoming messages. Each set of peripheral units is served by a respective bus bar BUS1, BUS2 connectable at one end, via an outgoing multiplexer MX12, MX22, to one of the branches of either output multiple 2, 3 and at the other end, via an incoming multiplexer MX11, MX21, to one of the branches of either input multiple 12, 13. The outgoing messages are also delivered, in parallel, to a pair of decision networks LS1, LS2 controlling the associated multiplexers MX12, MX22 in response to switching criteria obtained from a pair of intercommunicating synchronization circuits SN1, SN2 which are inserted in the two outgoing multiples upstream of their branching points. The sending of incoming messages from the peripheral units to the processors is preceded by access requests temporarily stored in parallel, under the control of a timing circuit BT, in a pair of buffer registers MT1 and MT2 respectively assigned to processors UP1 and UP2.

10 Claims, 7 Drawing Figures

| PL | KL | PR | KR | S | E |
|---|---|---|---|---|---|
| 0 | 0 | 0 | 0 | - | 0 |
| 1 | 0 | 0 | 0 | 1 | 1 |
| 0 | 1 | 0 | 0 | - | 0 |
| 1 | 1 | 0 | 0 | 1 | 1 |
| 0 | 0 | 1 | 0 | 0 | 1 |
| 1 | 0 | 1 | 0 | - | 0 |
| 0 | 1 | 1 | 0 | 0 | 1 |
| 1 | 1 | 1 | 0 | 1 | 1 |
| 0 | 0 | 0 | 1 | - | 0 |
| 1 | 0 | 0 | 1 | 1 | 1 |
| 0 | 1 | 0 | 1 | - | 0 |
| 1 | 1 | 0 | 1 | 1 | 1 |
| 0 | 0 | 1 | 1 | 0 | 1 |
| 1 | 0 | 1 | 1 | 0 | 1 |
| 0 | 1 | 1 | 1 | 0 | 1 |
| 1 | 1 | 1 | 1 | 1 | 1 |

FIG. 5

FIG.7

DUAL TESTING SYSTEM FOR SUPERVISING DUPLICATED TELECOMMUNICATION EQUIPMENT

FIELD OF THE INVENTION

Our present invention relates to a testing system for the supervision of duplicated telecommunication equipment.

BACKGROUND OF THE INVENTION

The duplication of switching networks and other assemblies intervening in the establishment of connections between stations of telephone and other telecommunication systems enables the immediate substitution of a standby assembly for a normally used main assembly if the latter develops a malfunction. In order to avoid a switchover to a faulty standby assembly, it is necessary that both the main and the standby assembly be monitored continuously or periodically to determine their operating efficiency, for example. The testing of such equipment used in a time-sharing communication system may be carried out in special time slots not utilized for the transmission of information between subscribers, e.g. as described in U.S. Pat. No. 3,641,275. Thus, a processor may be programmed to send, at certain times, instructions to various ancillary units such as line testers monitoring the operation of the supervised assembly, these units in turn sending back data to the processor which on the basis thereof determines whether the assembly functions satisfactorily or needs to be replaced. For a correct determination of the utility of a switchover to a standby assembly it is, of course, important to ascertain whether the testing processor is itself free from malfunctions. If, for this purpose, duplicate testing processors are respectively assigned to the two interchangeable assemblies, checking these two processors with the aid of a third processor would greatly add to the complexity of the system.

OBJECTS OF THE INVENTION

The general object of our present invention, therefore, is to provide a dual testing system of the character referred to which is of simple construction and avoids the need for a separate (third) processor.

A more particular object is to provide a testing system of this nature which can continue to carry out its supervisory function even in the event of a breakdown in some part thereof.

SUMMARY OF THE INVENTION

A dual testing system according to our invention comprises a pair of mutually independent and substantially identical command sections and a pair of mutually independent and substantially identical monitoring sections, the command sections including respective processors whereas the monitoring sections include the assemblies to be supervised together with their associated sets of ancillary units. A transmitting path in each command section, designed to carry outgoing messages or instructions from the processor thereof, has a pair of parallel outgoing branches leading to the two monitoring sections. Each command section also includes a receiving path for incoming messages destined for its processor, this path having a pair of parallel incoming branches extending from the two monitoring sections. First routing means in the monitoring sections, such as a pair of outgoing multiplexers, and second routing means in the command sections, such as a pair of incoming multiplexers, direct the outgoing messages from each processor to either set of ancillary units and the incoming messages from each set of ancillary units to either processor, under the control of check means connected to the two transmitting paths. The check means may comprise a decision network in each monitoring section supplying switching signals to the outgoing multiplexers in response to information on the correlation of the instructions sent out by the two processors, that information forming part of the instructions themselves and being ascertained with the aid of a two-way connection linking these processors.

BRIEF DESCRIPTION OF THE DRAWING

The above and other features of our invention will now be described in detail with reference to the accompanying drawing in which.

SPECIFIC DESCRIPTION

Figure 1:
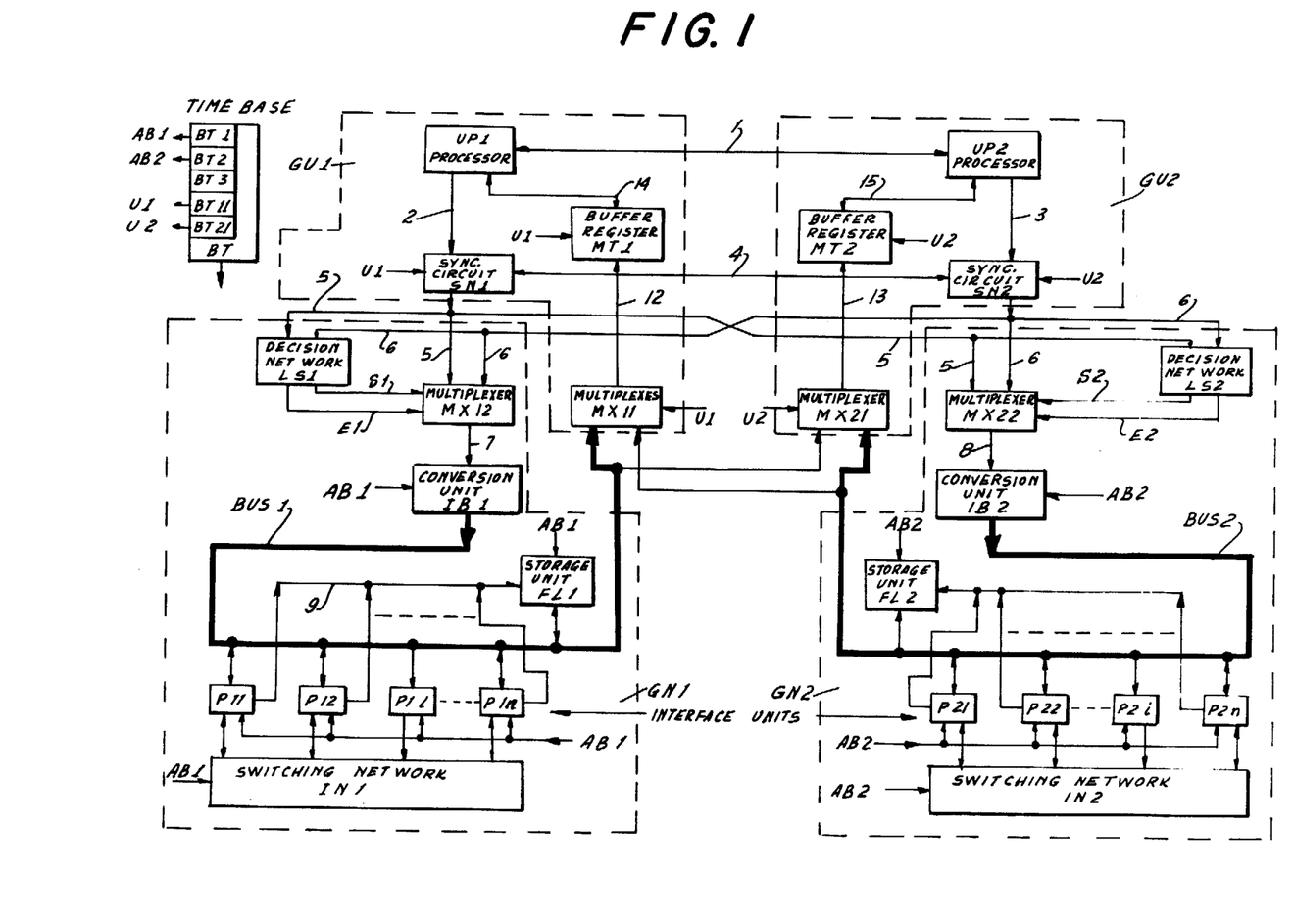
FIG. 1 is a block diagram of a dual testing system embodying our invention.

In FIG. 1 we have shown a dual testing system designed to monitor the operation of duplicated communication equipment, namely a main switching network IN1 and a standby switching network IN2, under the control of a pair of processors UP1 and UP2. The system is divided into two monitoring sections GN1, GN2 and two command sections GU1, GU2, sections GN1 and GN2 including the two supervised assemblies IN1 and IN2 whereas sections GU1 and GU2 include the two processors UP1 and UP2. The system further comprises a time base BT divided into several timers BT1, BT2, BT3, BT11 and BT21. Although, for convenience, unit BT has been shown located outside the aforementioned sections, the individual timers BT1, BT2, BT11 and BT21 may be considered as forming part of sections GN1, GN2, GU1 and GU2, respectively.

The two processors UP1 and UP2 are interconnected by a bidirectional line 1 for the exchange of outgoing messages (referred to hereinafter as instructions) which are to be transmitted, for test purposes, to the switching networks IN1 and IN2 under the control of a nonillustrated programmer. These instructions pass by way of respective lines 2 and 3 to a pair of synchronizing circuits SN1 and SN2 receiving timing signals U1 and U2 from timers BT11 and BT21. Messages destined for the processors UP1 and UP2, originating in monitoring sections GN1 and GN2, are received via respective multiples (termed bus bars) BUS1 and BUS2 by two incoming multiplexers MX11 and MX21 which are also under the control of timing signals U1 and U2. These multiplexers feed the incoming messages via lines 12 and 13 to a pair of buffer registers MT1 and MT2 for forwarding, again under the control of pulses U1 and U2, to processors UP1 and UP2 by way of lines 14 and 15. Components SN1, MT1 and MX11 are all part of command section GU1; the analogous components SN2, MT2 and MX21 are part of the identically structured command section GU2.

The constituents of section GN1 include, besides switching network IN1, a multiplicity of interface units P11, P12 ... P1i, ... P1n and a storage unit FL1 inserted between that switching network and common multiple BUS1; analogous units in section GN2 have been designated P21, P22 ... P2i, ... P2n, FL2 and are inserted between network IN2 and common multiple BUS2. In contradistinction to the processors UP1 and UP2, which are part of the centralized equipment of a telephone or other telecommunication exchange, ancillary units P11 – P1n, FL1 and P21 – P2n, FL2 may be referred to as peripheral components. Other elements of section GN1 are a decision network LS1, an outgoing multiplexer MX12 and a conversion unit IB1; their counterparts in section GN2 have been designated LS2, MX22 and IB2.

Synchronization circuit SN1, which is linked with circuit SN2 by a transverse two-way connection 4, has an output multiple 5 with branches extending within section GN1 to components LS1, MX12 and within section GN2 to the corresponding components LS2, MX22. Analogously, an output multiple 6 of synchronization circuit SN2 has outgoing branches terminating within sections GN1 and GN2 at decision networks LS1 and LS2 and at multiplexers MX12 and MX22. Conversely, each multiple BUS1 and BUS2 terminates in a pair of incoming branches extending to multiplexers MX11 and MX12.

Multiplexer MX12 is controlled by output signals S1 and E1 of decision network LS1 in order to determine whether an outgoing message from processor UP1 or from processor UP2 (or neither) is to be transmitted via a multiple 7 to conversion unit IB1 and thence, in response to signals AB1 from timer BT1, over multiple BUS1 to whichever peripheral interface unit P11 etc. that message is intended for. Timing signals AB1 are also supplied to switching network IN1, interface units P11 etc. and storage unit FL1 which is linked with these interface units via a common signal line 9.

Analogously, multiplexer MX22 may direct a message from either processor, under the control of output signals S2 and E2 of decision network LS2, via a multiple 8 to conversion unit IB2 for forwarding to one of the associated peripheral units P21 etc. over multiple BUS2. Switching network IN2, peripheral units P21 etc. and conversion unit IB2 as well as storage unit FL2 are all controlled by pulses AB2 from timer BT2.

Normally, the two processors UP1 and UP2 operate in step with each other and send identical instructions to the associated sync circuits SN1 and SN2. The simultaneous arrival of these instructions at the two sync circuits is verified by way of connection 4; if only one sync circuit receives such a message from the associated processor, i.e. if no counterpart of the instruction appears on line 4 within a predetermined interval as measured by an internal timer such as a monoflop within the active sync circuit, that circuit alone sends out the received instruction over its output multiple 5 or 6 to decision networks LS1, LS2 and multiplexers MX12, MX22 in parallel.

The purpose of conversion units IB1 and IB2 is to change the format of the outgoing instructions, destined for any peripheral interface unit P11 etc. or P21 etc., in regard to signal levels and phasing so as to facilitate their transmission over multiple BUS1 or BUS2 without interfering with any reverse message sent back by these peripheral units to processor UP1 or UP2 by way of buffer registers MT1 and MT2. The buffer registers, in turn, time the retransmission of the incoming messages so as to avoid interference with the programmed operations of the processors themselves, these operations taking place in time slots specifically assigned thereto. Storage units FL1 and FL2 intervene in the transmission of reverse messages by registering the addresses of peripheral units demanding access to a processor and furnishing these addresses to buffer registers MT1 and MT2 in response to a request code from the respective processor; the latter, on receiving the addresses from the associated buffer register, establishes the order in which data from these peripheral units are to be sent back and transmits corresponding authorization codes, as part of its outgoing messages, to the units involved.

Time base BT includes logical circuitry for correlating the operation of its several timers by the principle of majority logic. Thus, the three timers BT1, BT2 and BT3 are interconnected to exchange binary synchronizing pulses supplied by each timer of this group to the other two; the output signals AB1 and AB2 are at a level corresponding to the logical value of two or all three of the simultaneously generated synchronizing pulses, i.e. at zero level when at least two synchronizing pulses have the value "0" and at unity level when they have the value "1". The third timer BT3 emits no external signal but merely serves to resynchronize the other two timers BT1, BT2 when they are out of step. Signals U1 and U2 emitted by timers BT11 and BT21 are directly derived, by frequency division, from output signals AB1 and AB2 of timers BT1 and BT2 as will be apparent from the three top graphs of FIG. 4 discussed below.

Figure 2:
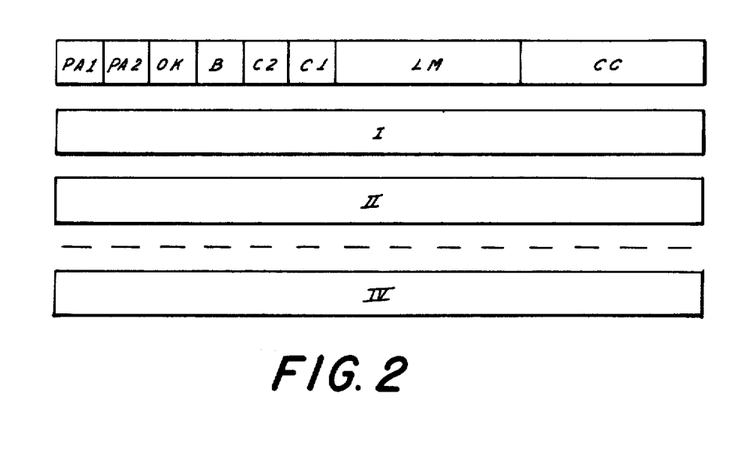
FIG. 2 shows the layout of a multiword instruction utilized in the system of FIG. 1.

In FIG. 2 we have shown the layout of a representative instruction read out from processors UP1 and UP2. The instruction is divided into a service word and several data words (four in this specific instance) numbered I, II, ... IV. The bits of the service word or preface are grouped in eight zones PA1, PA2, OK, B, C2, C1, LM and CC. Zones PA1 and PA2 contain bits used for a parity check to determine the integrity of the service word. Zone OK carries a bit which has the logical value "1" in the case of identity of the instructions issuing from the two processors, as determined via connection 1; if these instructions are not identical, or if one of them is lacking, this bit has the value "0". Zone B contains a discriminating bit to indicate whether or not the addressed peripheral unit is capable of reverse transmission by way of multiple BUS1 or BUS2. The bits in zones C1 and C2 indicate whether the instruction is intended for section GN1 only (C1 = 0, C2 = 1), for section GN2 only (C1 = 1, C2 = 0), or for both sections (C1 = C2 = 0). The fourth bit combination, i.e. C1 = C2 = 1 ("neither section"), obviously would be meaningless. Zone LM specifies the number of data words included in the instruction; zone CC, finally, contains the address of the peripheral unit for which the instruction is destined.

Figure 3:
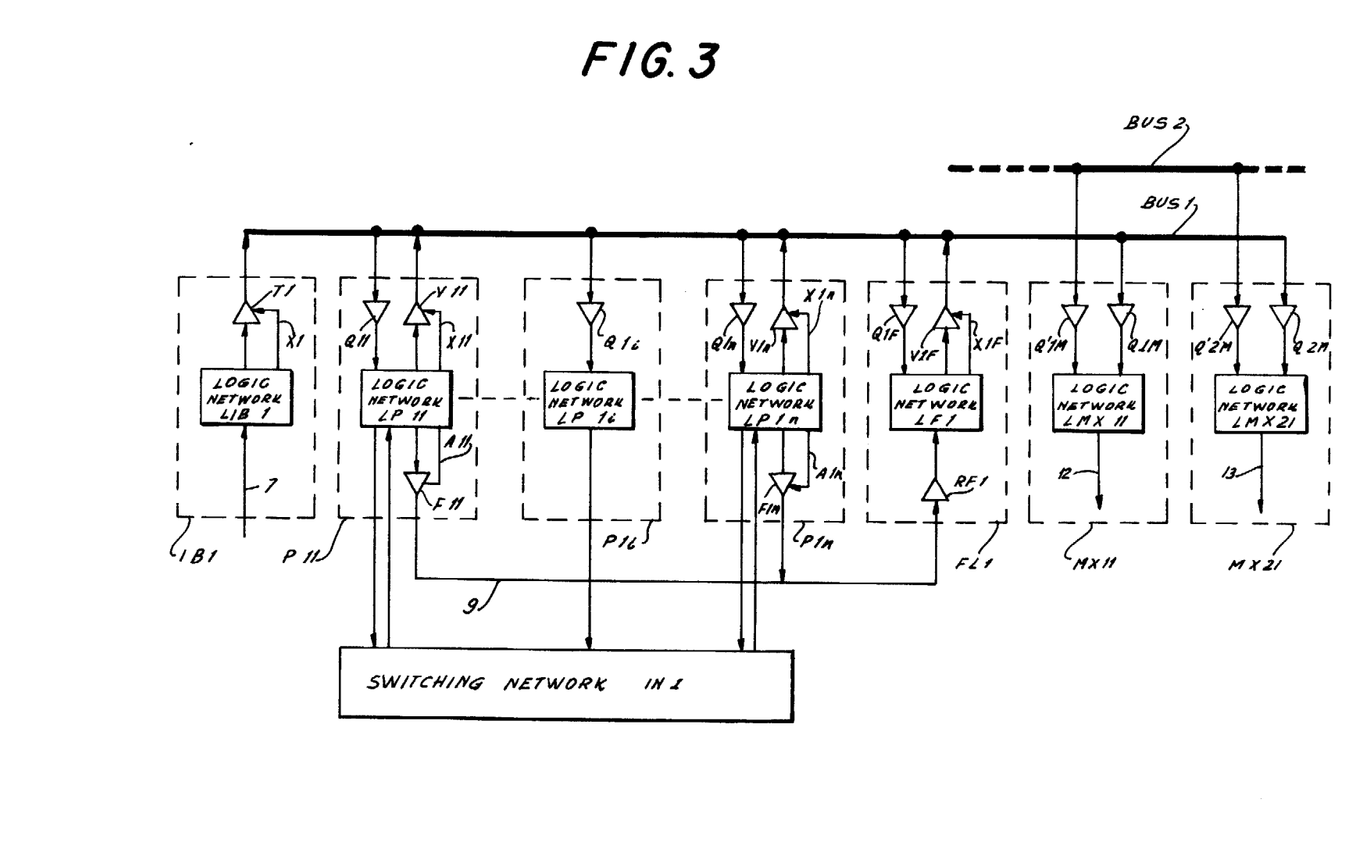
FIG. 3 is a more detailed diagram of certain components of the system.

In FIG. 3 we have shown details of peripheral units P11 – P1n, interface unit IB1 and storage circuit FL1 of section GN1 as well as of the two multiplexers MX11 and MX21 of sections GU1 and GU2. Units IB1, P11 – P1n and FL1 are, of course, also representative of their counterparts IB2, P21 – P2n and FL2 in section GN2.

Interface unit IB1 comprises a logic network LIB1 working through a transmitting circuit T1 into multiple BUS1. Units P11, ... P1$i$, ... P1$n$ have logic networks LP11, ... LP1$i$, ... LP1$n$ communicating with this multiple via receiving circuits Q11, ... Q1$i$, ... Q1$n$ and in some instances, as particularly illustrated for unit P11 and P1$n$, also by way of transmitting circuits V11 and V1$n$. These latter units are in two-way communication with switching network IN1 and also work through further transmitting circuits F11, F1$n$ via line 9 into a receiving circuit RF1 of a logic network LF1 in storage unit FL1. Unit P1$i$ is representative of a number of peripheral interface units which can only receive messages from multiple BUS1 and which therefore have only an output extending to switching network IN1. Logic network LF1 communicates with multiple BUS1 by way of transmitting and receiving circuits V1F and Q1F. Multiplexers MX11 and MX21 are connected to multiple BUS1 through receiving circuits Q1M, Q2M and to multiple BUS2 through receiving circuits Q'1M and Q'2M. The aforementioned transmitting and receiving circuits consist each of a group of gates (e.g. amplifiers) passing all the bits of a message word in parallel.

Transmitters T1, V11 - V1$n$, V1F and F11 - F1$n$ are normally inoperative and are unblocked by respective pulses X1, X11 - X1$n$, X1F and A11 - A1$n$ generated by timing signals AB1, U1, U2 (FIGS. 1 and 4) which have not been illustrated in FIG. 3.

Figure 4:
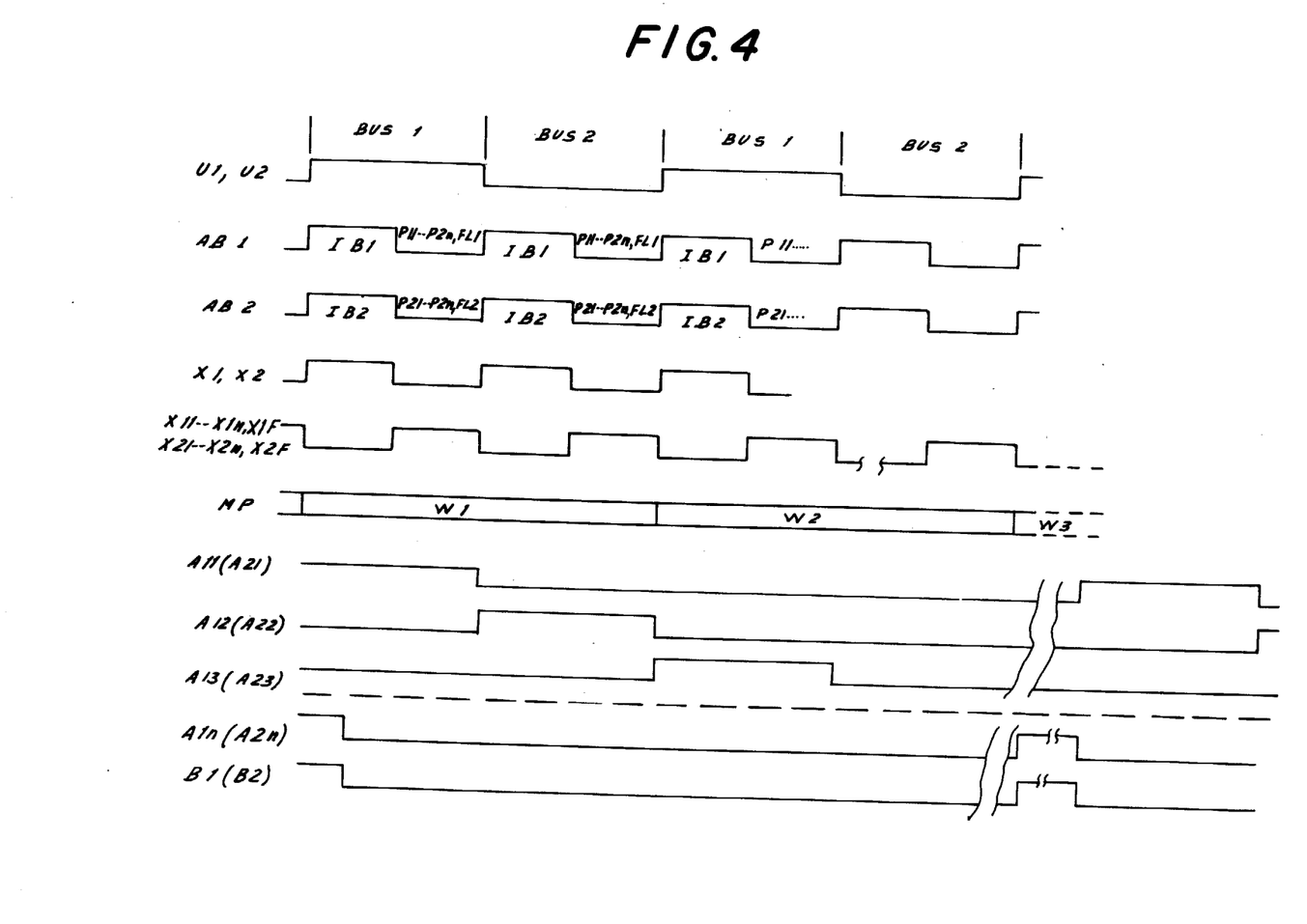
FIG. 4 is a set of graphs relating to the operation of the system.

FIG. 4 shows the timing signals U1, U2 as identical square waves which, when applied to multiplexers MX11 and MX21, alternately connect the two multiples BUS1 and BUS2 to the inputs of buffer registers MT1 and MT2 in parallel. Timing signals AB1 and AB2 are also identical square waves, with twice the frequency of signals U1 and U2. In a first half-cycle, signals AB1 and AB2 respectively enable the conversion units IB1 and IB2 to convey to multiples BUS1 and BUS2 the instructions received over lines 7 and 8 for transmission to the selected ancillary units P11 - P1$n$, FL1 and P21 - P2$n$, FL2; in a second half-cycle they enable the transmission of reverse messages to the processors from sections GN1 and GN2, respectively, provided of course that the corresponding multiple BUS1 or BUS2 is extended to lines 12 and 13 under the control of signals U1 and U2.

Thus, in the second half of the first cycle of the square wave shown in the top graph of FIG. 4, with U1 = U2 = 1 and AB1 = AB2 = 0, the peripheral units P11 - P1$n$, FL1 have access to the processors via multiple BUS1; in the second half of the second cycle, with U1 = U2 = AB1 = AB2 = 0, this access is given to units P21 - P2$n$, FL2 via multiple BUS2.

The internally generated signal X1 in unit IB1, see FIG. 3, and an identical signal X2 generated in unit IB2 are square waves in phase with signals AB1 and AB2, as likewise illustrated in FIG. 4. Signals X11 - X1$n$, X1F of FIG. 3, internally generated in the peripheral units of section GN1, and their counterparts X21 - X2$n$, X2F, internally generated in the corresponding units of section GN2, are square waves of the same frequency as signals X1, X2 but in phase opposition therewith.

Graph MP in FIG. 4 is a succession of time slots, each of a duration equal to a cycle of square wave U1, U2, during which data words W1, W2, W3 etc. intended for reverse transmission to the processors are presented in section GN1, GN2 to message transmitters such as circuits V11, V1$n$, V1F (FIG. 3) of all the transmit/receive ancillary units thereof. Each of these data words is read out twice, upon the corresponding enabling signals X11, X1$n$, X1F assuming the logical value "1".

The internal signals A11, A12, A13, ... A1$n$, generated in the two-way peripheral unit such as P11 and P1$n$ (FIG. 3), and their counterparts A21, A22, A23, ... A2$n$, generated in corresponding units of section GN2, occur at staggered intervals in successive cycles of square waves AB1, AB2 etc. shown in FIG. 4. The last signal A1$n$ (or A2$n$) of this series, which serve for the transmission of access requests from their peripheral units to storage circuit FL1 (or FL2) via connection 9, is extended by an accompanying signal B1 (or B2) from timer BT1 (or BT2) which informs the storage unit FL1 (or FL2) that the end of the series has been reached. The sequence is then repeated.

Figure 5:
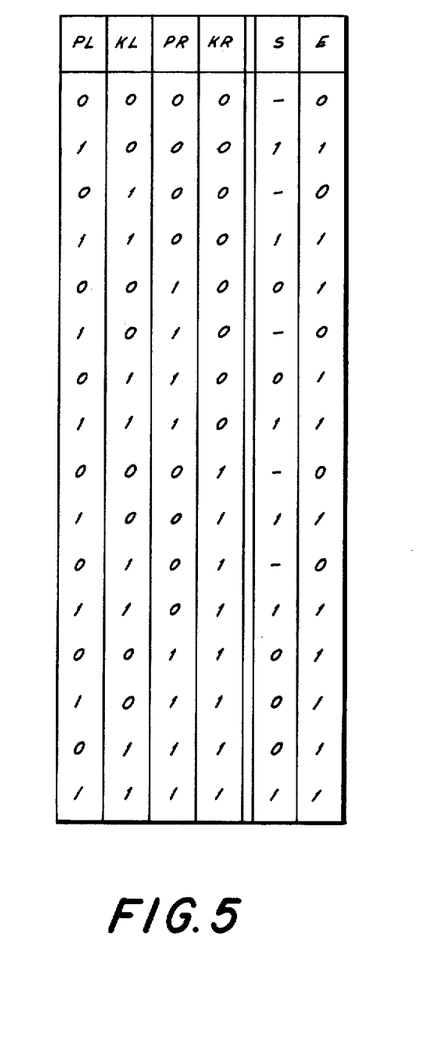
FIG. 5 represents a truth table pertaining to certain logic networks included in the system of FIG. 1.

FIG. 5 represents the truth table for the logic of decision networks LS1 and LS2. In the four left-hand columns of that table, the letter L (for "local") relates to instructions emanating from the associated processor (UP1 in the case of network LS1, UP2 in the case of network LS2) whereas R (for "remote") indicates an instruction coming from the opposite processor. For network LS1, therefore, criteria PL and KL are derived from the output 5 of circuit SN1 whereas criteria PR and KR are obtained from the output 6 of circuit SN2; for network LS2 the reverse is true.

These four criteria are derived from the bits contained in zones PA1, PA2 and OK (FIG. 2) of the service word in the instruction considered. More particularly, signals PL and PR indicate by their logical value "1" that the parity check carried out by circuits SN1 and SN2 with the aid of the bits in zones PA1 and PA2 has had a positive result; otherwise, i.e. if that test was unsuccessful in the associated or in the opposite synchronization circuit, the corresponding signal PL or PR will have the value "0". Signal KL has the value "1" upon a determination by the associated processor, with the aid of connection 1, that the instruction issuing from that processor is identical with the one simultaneously sent out by the opposite processor; in the absence of such an identity, signal KR has the value "0". Signal KR has the same significance in regard to the determination carried out by the opposite processor. Evidently, therefore, a disparity between these two correlation signals means that the verification circuit of at least one processor is faulty. The relatively remote possibilty of simultaneous mutually unrelated malfunctions in both processors will be disregarded in the following discussion.

From these four input signals PL, KL, PR and KR, each decision network produces a combination of output signals, S1, E1 and S2, E2 which have been generically represented by letters S and E in the two right-hand columns of the truth table of FIG. 5. A switching signal S = 1 sets the associated multiplexer MX12 or MX22 to connect the local input multiple 5 or 6 to its output multiple 7 or 8; with S = 0 the situation is reversed. An enabling signal E = 1 unblocks the output of the associated multiplexer; with E = 0 the multiplexer is inhibited. In the latter instance, the value of switching signal S is immaterial as indicated by a dash (—) in the corresponding column of the table.

Such a situation arises in five instances, namely in the four cases where the parity tests in both circuits SN1, SN2 are negative (PL = PR = 0) and also in the case where these tests are positive (PL = PR = 1) but the lack of correlation at both ends of line 4 (KL = KR =

0) suggests a malfunction along that line. Otherwise, the local processor and synchronization circuit are selected (S = 1) whenever a signal PL = 1 indicates a proper functioning of that processor, except in the case of PL = PR = KR = 1, KL = 0 (antepenultimate row in the truth table) where the absence of verification of message identity in the local synchonization circuit points to a malfunction in that circuit. When all input signals are "Go", i.e. with PL = KL = PR = KR = 1 as shown in the bottom row of the table, the local processor is also given preference.

Figure 6:
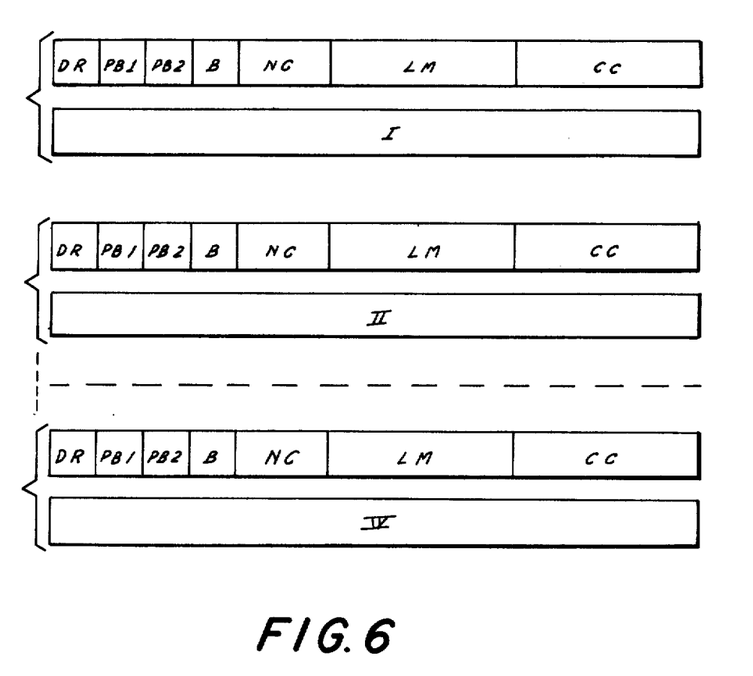
FIG. 6 is a view similar to FIG. 2, showing the layout of a transformed instruction.

Upon the arrival of an instruction as shown in FIG. 2 at conversion unit IB1 or IB2, that instruction is modified as indicated in FIG. 6 with replacement of it preamble by an individual service word preceding each data word I - IV. The service words of FIG. 6 are all identical and differ from the service word of FIG. 2 by the substitution of zones DR, PN1, PB2 and NC for zones PA1, PA2, OK and C2, C1, respectively. Zone DR carries a "data ready" bit announcing the associated data word. Zone PB1 contains a redundancy enabling a parity check on all the bits of that service word following its zone B. Zone PB2 carries a similar redundancy for the parity check on the associated data word. Zone NC contains a numerical code representing the order number of the associated data word in the instruction, this code thus having a decimal value ranging from 1 to 4 in the specific example here considered. In the service word preceding the last data word (IV), this numerical count equals the information present in zone LM which, like zone CC, has the same contents as in the original instruction shown in FIG. 2. The transformation from the format of FIG. 2 to that of FIG. 6 provides added safeguards against errors in the transmission of instructions from the processors to the ancillary units serving the assemblies IN1, IN2.

Figure 7:
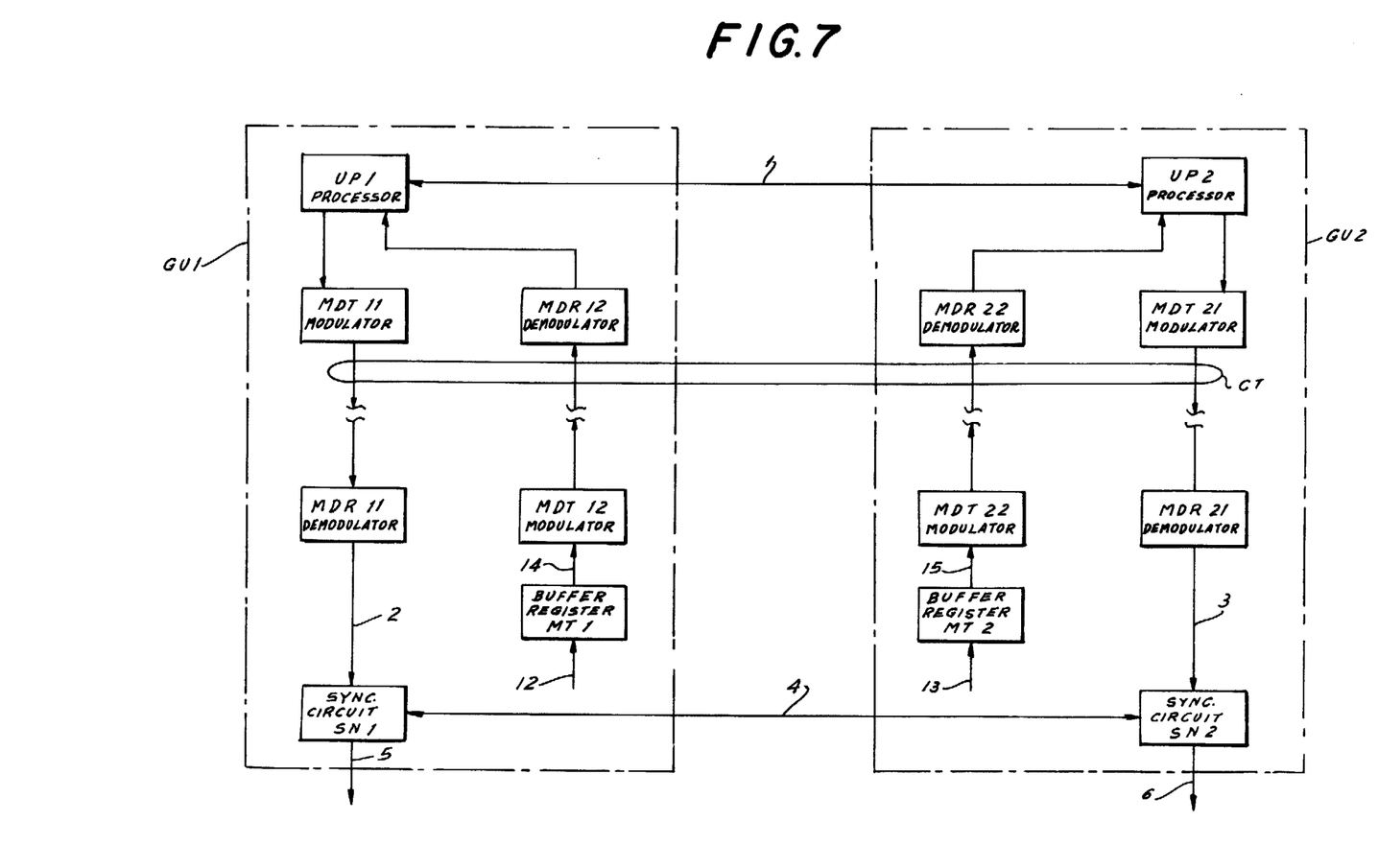
FIG. 7 is a block diagram similar to part of FIG. 1, illustrating a modification.

In FIG. 7 we have illustrated an expanded version of the command sections GU1, GU2 of FIG. 1 wherein the output and input lines 2, 3 and 14, 15 of processors UP1, UP2 form respective channels of a transmission path CT over which the outgoing and incoming messages are sent with the aid of a carrier, e.g. by pulse-code modulation. Thus, each channel is provided at its input end with a modulator MDT11, MDT12, MDT21, MDT22 (downstream of processor UP1, buffer register MT1, processor UP2 and buffer register MT2, respectively) and at its output end with a complementary demodulator MDR11, MDR12, MDR21 MDR22 (upstream of synchronization circuit SN1, processor UP1, synchronization circuit SN2 and processor UP2, respectively). This system operates otherwise in the same way as the one shown in FIG. 1, as will now be described in detail.

OPERATION

Let us consider the exchange of messages between the two processors UP1 and UP2, on the one hand, and one of the other ancillary units in the monitoring section GN1 containing the main switching network IN1, specifically the peripheral interface unit P11.

The two processors simultaneously generate a pair of outgoing messages representing an instruction of the type shown in FIG. 2 and, via connection 1, ascertain whether these messages are in fact identical. If the determination independently made by each processor is positive, that processor inserts a bit "1" in zone B of the service word of the outgoing message. If, on the other hand, a processor obtains a negative result from the correlation test, that processor may first check itself by conventional means to find out whether its own circuits operate properly; if they do not, the processor will disconnect itself from the supervisory system and send out an alarm.

As noted above, we shall assume that at least one processor functions correctly and, in response to the ascertained message disparity, inserts a bit "0" in zone OK. The message can thus proceed to the associated synchronization circuit SN1 or SN2 by way of transmitting line 2 or 3.

Under normal conditions, the correlation bit OK = 1 will appear in the instruction issuing from each processor UP1 and UP2, that instruction being intended for peripheral unit P11 in accordance with the specific example here given. The complete message shown in FIG. 2 will then be read out from sync circuits SN1 and SN2, by way of multiples 5 and 6, respectively, to multiplexers MX12, MX22 and to decision networks LS1, LS2 in parallel.

Networks LS1 and LS2 now carry out a parity check on the basis of the bits contained in zone PA1 and PA2. If both parity checks are successful, the situation represented by the bottom row of the truth table of FIG. 5 obtains whereby signals S1, E1 and S2, E2 are generated in the outputs of these networks. Multiplexer MX12 then connects its own output multiple 7 to the output multiple 5 of sync circuit SN1 while multiplexer MX22 interconnects the corresponding multiples 6 and 8. If the multiplexers operate properly and no fault exists along the transmission paths, the instruction from each processor UP1, UP2 will reach the associated bus bars BUS1, BUS2, even though in the present example only the unit P11 served by the first bus bar will be affected thereby.

If, on the other hand, one of the two decision networks detects a parity error so that either PL = 0 or PR = 0 in the truth table of FIG. 5, only the message free from such parity error will be allowed to proceed toward the bus bars by way of the two outgoing multiplexers MX12, MX22 to which that message is fed in parallel. Thus, if processor UP1 is at fault, decision network LS1 will operate in accordance with the penultimate row of FIG. 5 (PL = 0) to let the multiplexer MX12 route the instruction from sync circuit SN2 via multiples 6 and 7 to conversion unit IB1 whereas decision network LS2, operating in accordance with the fifth-lowest row of FIG. 5 (PR = 0), establishes the same connection as before between network SN2 and conversion unit IB2. In any event, therefore, the two conversion units IB1 and IB2 receive the same message.

Each conversion unit determines from the contents of the service word how many data words the instruction proper consists of (zone LM) and which bus bar the instruction is intended for (zone C1, C2). In the present instance, therefore, unit IB2 remains inactive whereas unit IB1, under the control of timing signal AB1 (FIG. 4), generates the signal XL to unblock its transmitter T1 (FIG. 3) for delivering to multiple BUS1 the modified instruction shown in FIG. 6. In this modified instruction, the service word preceding any data word is transmitted in the first quarter and the data word itself is transmitted in the third quarter of a cycle of the basic square wave U1, U2 (FIG. 4).

The receivers Q11 - Q1$n$ of all the peripheral interface units P11 - P1$n$ are always conditioned to feed an instruction on bus bar BUS1 to the corresponding logic network LP11 - LP1$n$ where the instruction is decoded on the basis of the bits contained in zones CC and DR thereof (FIG. 6). The presence of a bit B = 1 in each data word of the instruction eliminates one-way units such as P1i, not equipped for sending back messages, as potential addressees.

The actual addressee, i.e. unit P11 in the present instance, accepts the successively arriving word pairs of the instruction and, from the bits contained in zones NC and LM, determines whether the correct number of data words have been received. Its logic network LP11 also carries out a parity check on the basis of the bits contained in zones PB1 and PB2. If all the checks are positive, unit P11 performs the instruction; otherwise, it sends out an alarm signal to processors UP1 and UP2 through the intermediary of the associated storage unit FL1 as more fully described hereinafter.

The discriminating bit B = 1 of a service word is recognized by the unit P11 as an authorization for activating its transmitting circuit V11, via internal signal X11, for the purpose of sending a possible reply message to the processors. This authorization is terminated by the arrival, on bus bar BUS1, of another instruction intended for a different two-way unit such as, for example, unit P1n. Upon detecting the address of that other unit together with the discriminating bit B = 1 in a service word of a new instruction, logic network LP11 terminates the periodic generation of signal X11 so that unit P1n can now respond to the message from the processors. In this way, only one reverse message at a time is sent over multiple BUS1 to multiplexers MX11 and MX21. The internal enabling signal X11 is not terminated if the new message, though addressed to a different unit, contains the bit B = 0 to identify a unit such as P1i designed only for one-way communication.

No service words are needed for the sending of reverse messages from the ancillary units to the processors inasmuch as each processor stores information identifying the unit to which a particular data word pertains. Thus, these reverse messages consist only of data words which are characteristically different for all the units P11 - P1n, FL1 and P21 - P2n, FL2. With the internal signals X11 etc. coming into existence twice per cycle of square wave U1 and U2, each word of such a reverse message appears twice on the corresponding bus bar in order to be picked up alternately by incoming multiplexers MX11 and MX21 for forwarding to buffer registers MT1 and MT2.

When unit P11, for example, is ready to send out such a reverse message (be it as a reply or as an alarm signal), it energizes the lead 9 in the time slot assigned to that unit by the associated timing pulse ALL (FIG. 4) as a request for access to a processor. Storage unit FL1 registers this request in a cell individually allocated to unit P11 and then waits for the arrival of an instruction, via bus bar BUS1, of the type shown in FIG. 6 and addressed specifically to this storage unit. In the course of a scanning cycle initiated by signal B1 (FIG. 4), unit FL1 then generates its internal signal XLF (FIGS. 3 and 4) enabling it s transmission circuit V1F to deliver to bus bar BUSI a message PM identifying all the associated interface units from which access requests were previously received. Each word W1, W2 etc. of this message reaches buffer registers MT1 and MT2 through multiplexers MX11 and MX21 in the second quarter of the first cycle of square wave U1, U2, with X1F = U1 = U2 = 1. Registers MT1 and MT2 have a capacity sufficient to store all the words of such a request message received from storage unit FL1 or FL2 during the interval allocated thereto, without interfering with the operations of the associated processors. For this purpose a blocking signal may be included in the request message or may be sent to the registers MT1 and MT2 by the processors concurrently with the emission of an instruction addressed to either storage unit.

At certain times in their program processors UP1 and UP2 extract from registers MT1 and MT2 the request messages stored therein and thereupon successively address the corresponding interface units by instructions, such as that shown in FIG. 2, commanding each unit to connect itself to bus bar BUS1 (or BUS2) in order to transmit its own message. The unit P11 here considered by way of example, in complying with this command, reads out a message MP (FIG. 4) in the manner described above with reference to unit FL1 but with only brief storage in registers MT1 and MT2.

The sending of a request from an interface unit to storage unit FL1 (or FL2) precedes any direct message transmission from that interface unit even if the latter was already connected previously to the associated bus bar. The transmission from the processors to the peripheral interface units, however, proceeds without intervention of the storage units.

The bidirectional connections existing between all the two-way interface units and the associated switching network IN1 or IN2 enables these units to perform all the necessary monitoring operations on these networks, on the basis of the instructions received from the processors, and to receive continuous information on the state of these networks which is to be relayed to the processors.

From the foregoing description it will be apparent that a malfunction occurring in any one section or block GU1, GU2, GN1, GN2 does not prevent the continuing supervision of assemblies IN1 and/or IN2 through the remaining parts of the system. Thus, a failure in section GN1 — while resulting in an alarm condition requiring a switchover from assembly IN1 to assembly IN2 — does not interfere with the testing of the now activated assembly by the two processors. No switchover will be needed if such a failure occurs in section GN2, assembly IN1 then continuing its operation under the supervision of both processors. If a breakdown occurs in one of the command sections GU1 or GU2, the processor of the other command section still controls the monitoring of both assemblies IN1 and IN2.

The continuity of the transmission paths and the correct operation of the various intermediate components of our improved supervisory system can be tested by a method known as "echo check" by which the processors command any peripheral unit to send back a predetermined message which is then evaluated by both processors simultaneously.

The use of a common multiple or bus bar for all the peripheral units of a monitoring section facilitates inclusion of additional units to keep pace with any expansion of the supervised assemblies or to satisfy a need for more elaborate testing procedures.

The dependability and versatility of our improved system makes it particularly suitable for remote testing with the aid of intervening signal-transmitting channels as described in connection with FIG. 7.

We claim:
1. A dual testing system for supervising the performance of two substantially identical assemblies of telecommunication equipment served by respective sets of ancillary units, comprising:

a pair of mutually independent and substantially identical command sections each comprising a processor programmed to transmit outgoing messages to designated ancillary units of either of said sets and to receive incoming messages from said ancillary units;

a pair of mutually independent and substantially identical monitoring sections each including one of said assemblies and the associated set of ancillary units;

a transmitting path in each of said command sections for outgoing messages originating at the processor thereof, said transmitting path having a pair of parallel outgoing branches each leading to one of said monitoring sections;

a receiving path in each of said command sections for incoming messages destined for the processor thereof, said receiving path having a pair of parallel incoming branches each extending from one of said monitoring sections;

check means connected to said transmitting paths for determining the performance of said processors;

first routing means in each of said monitoring sections for selectively directing said outgoing messages from either of said processors, under the control of said check means, to designated units in the corresponding set of ancillary units and second routing means in said command sections for directing any incoming message from either of said sets of ancillary units to both said processors.

2. A system as defined in claim 1 wherein said check means includes a two-way connection between said processors for ascertaining the correlation of outgoing messages simultaneously delivered to said transmitting paths.

3. A system as defined in claim 2 wherein said outgoing messages include information on the correlation of said outgoing messages as ascertained by said processors, said check means further comprising a decision network in each of said monitoring sections supplying switching signals to said first routing means in response to said information.

4. A system as defined in claim 3 wherein said check means further comprises two intercommunicating synchronization circuits, one in each transmitting path upstream of said outgoing branches, a buffer register for incoming messages in each receiving path downstream of said incoming branches, and timing means controlling said synchronization circuits and said buffer registers for simultaneously delivering outgoing messages from both command sections via said outgoing branches to both monitoring sections while sequentially delivering an incoming message from either monitoring section to both processors, said decision networks being connected to said transmitting paths downstream of said synchronization circuits.

5. A system as defined in claim 4 wherein said timing means comprises an odd number of timers greater than two, said timers being interconnected for exchanging internal synchronizing pulses and generating identical pairs of timing pulses in conformity with logical coincidences of a majority of said synchronizing pulses.

6. A system as defined in claim 4 wherein said synchronization circuits are interconnected for concurrent readout of identical messages.

7. A system as defined in claim 4 wherein said first routing means comprises a first multiplexer in each monitoring section controlled by said switching signals and connected to one of said outgoing branches of each transmission path, said second routing means comprising a second multiplexer in each command section controlled by said timing means and connected to one of said incoming branches of each receiving path.

8. A system as defined in claim 7 wherein each monitoring section further includes a conversion unit for modifying outgoing messages received from said first multiplexer, said conversion unit being controlled by said timing means, and a bus bar extending from said conversion unit to said second multiplexer in each command section, said bus bar terminating in said incoming branches and being connected to all the ancillary units of the respective set.

9. A system as defined in claim 8 wherein said ancillary units include peripheral interface units inserted between said bus bar and the respective assembly, certain of said peripheral interface units being equipped for two-way exchange of messages between said assembly and said bar, said ancillary units further including a storage unit linked with said certain of said peripheral interface units transmitting access requests therefrom to said buffer registers under the control of said timing means.

10. A system as defined in claim 1 wherein said command sections include signal channels with modulators at their input ends and with demodulators at their output ends as part of said transmitting and receiving paths.

* * * * *